Aug. 11, 1925.
H. S. JANDUS
1,549,421
BUMPER
Filed Nov. 23, 1922    2 Sheets-Sheet 1
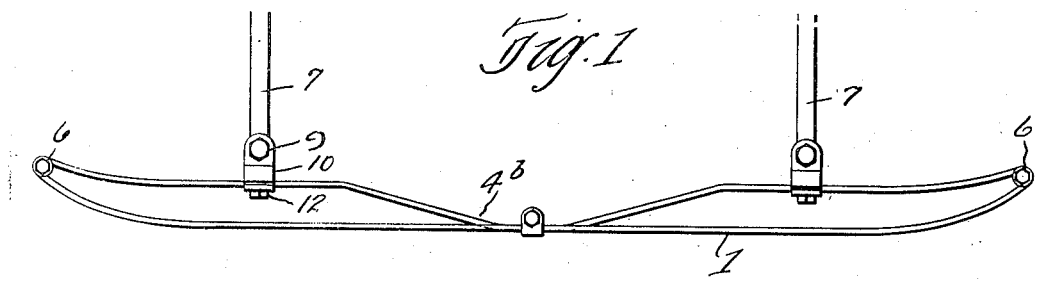
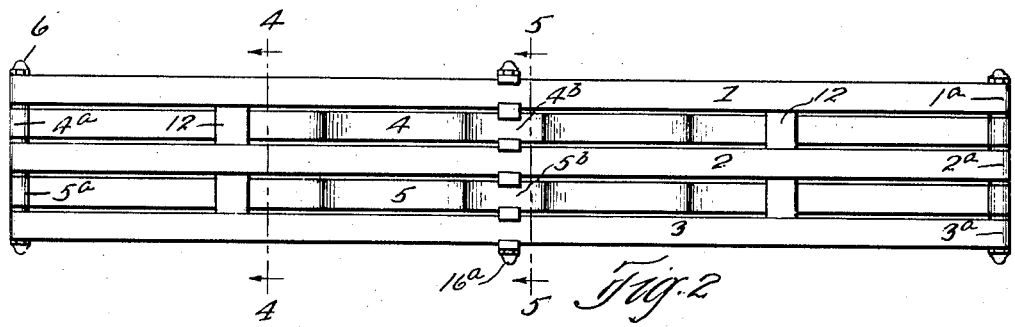
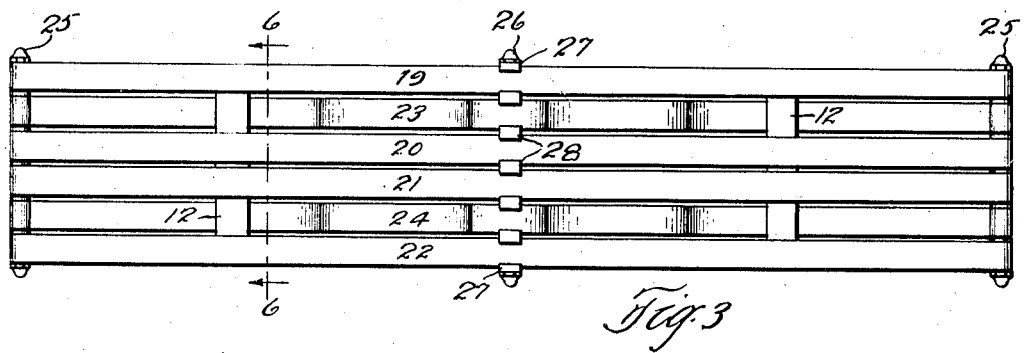
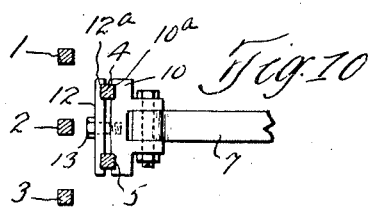
Inventor
Herbert S. Jandus,
By
Hull, Brock & West
Attys.

Aug. 11, 1925.
H. S. JANDUS
BUMPER
Filed Nov. 23, 1922    2 Sheets-Sheet 2
1,549,421
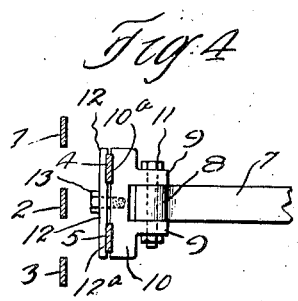
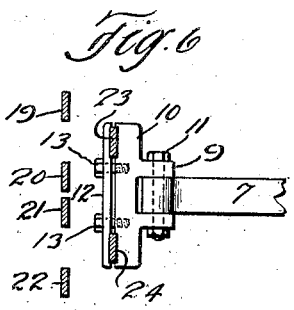
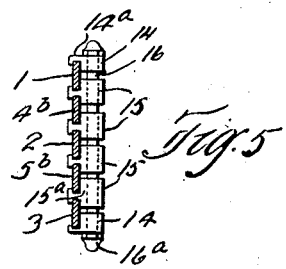
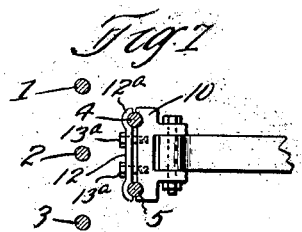
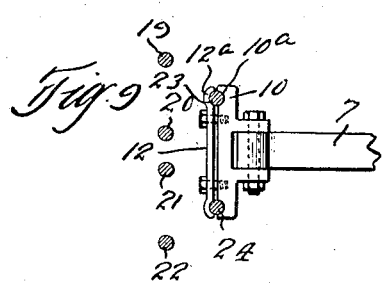
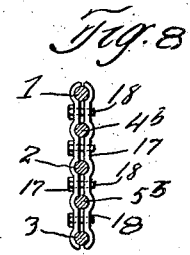
Inventor
Herbert S. Jandus,
By
Hull, Buck & West
Attys.

Patented Aug. 11, 1925.

1,549,421

UNITED STATES PATENT OFFICE.

HERBERT S. JANDUS, OF KALAMAZOO, MICHIGAN, ASSIGNOR TO THE C. G. SPRING & BUMPER COMPANY, OF DETROIT, MICHIGAN, A CORPORATION OF DELAWARE.

BUMPER.

Application filed November 23, 1922. Serial No. 602,726.

*To all whom it may concern:*

Be it known that I, HERBERT S. JANDUS, a citizen of the United States, residing at Kalamazoo, in the county of Kalamazoo and State of Michigan, have invented a certain new and useful Improvement in Bumpers, of which the following is a full, clear, and exact description, reference being had to the accompanying drawings.

This invention relates to automobile bumpers, and more particularly to bumpers of the type covered by the patent to Allan L. McGregor No. 1,372,154 issued March 22, 1921. The general object of the invention is to provide means whereby a bumper of the type shown in the patent above identified may be built up from a multiplicity of units, each unit comprising in itself a complete bumper thereby enabling a bumper of any desired width of impact face and of any desired strength to be produced, the width and strength varying with the number of units used in the assembly. A further object of the invention is to enable a bumper of such varying strength and width to be constructed in an economical manner, but with the production of a bumper which is calculated to withstand all of the ordinary incidents of use and to perform most effectively the objects for which it is intended. I accomplish the foregoing objects and other and more limited objects which will appear in connection with the detailed description hereinafter through the construction and arrangement of parts shown in the accompanying drawings, wherein Fig. 1 represents a plan view of a bumper constructed in accordance with my invention and indicating the manner in which it is mounted upon its supporting arm; Fig. 2 a front elevation of such bumper; Fig. 3 a view similar to Fig. 2 of another form of bumper embodying my invention; Figs. 4 and 5 sectional details corresponding to the lines 4—4 and 5—5 of Fig. 2; Fig. 6 a sectional detail corresponding to the line 6—6 of Fig. 3; Figs. 7 and 8 sectional details similar to Figs. 4 and 5, respectively, of a bumper similar to that shown in Fig. 2, but with the substitution of round bar stock for the first spring-plate stock shown in Fig. 2; Fig. 9 a sectional detail, similar to that shown in Fig. 6, but with the substitution of round bar stock for the flat spring plate stock; and Fig. 10 a sectional detail similar to Figs. 4 and 7 wherein the bumper is made of bars which are substantially square in section.

Describing the various parts by reference characters, and referring more particularly to the form of bumper shown in Figs. 1, 2, 4, 5, 7, 8 and 10, 1, 2 and 3 denote the front or impact bars of a bumper. These bars may be made of ordinary flat-plate spring stock, as shown in Figs. 1, 2, 4 and 5, or they may be made from round stock, such as shown in Figs. 7 and 8, or of square rod stock, such as shown in Fig. 10. The bars preferably extend the full width of the bumper, being curved rearwardly at their ends and each having an eye $1^a$, $2^a$ and $3^a$ at each end thereof, the eyes at the corresponding ends of the bars being adapted to be placed in vertical alignment with each other and in vertical alignment with the eyes on the corresponding ends of the rear or auxiliary bars, whereby all of the bars may be secured together at their ends into a unitary structure. Each rear or auxiliary bar 4, 5 also preferably extends the full width of the bumper and each is provided with an eye $4^a$ and $5^a$, respectively, at each end thereof adapted to align with and between the eyes of the front or impact members and to receive jointly therewith the vertical bolts 6.

Each bar 4 and 5 has its central portion projected toward the central portions of the front or impact members and preferably between adjacent impact members, as indicated at $4^b$ and $5^b$. The outer end portions of each of the bars 4 and 5 are spaced from the front or impact bars or plates and preferably extend nearly parallel with the end portions of the latter bars.

7 denotes a pair of arms which are secured to the side members of the vehicle, each arm having at its front or outer end an eye 8 which is adapted to extend between the upper and lower lugs 9 of one of the members 10 of a clamp, the said member being supported from its cooperating arm 7 by means of a bolt 11 extending through the lugs 9 and the eye 8. The clamping member 10 is provided with notched seats $10^a$ in its front or outer face each adapted to receive therewithin the corresponding rear or inner portion of a bar; the front or outer clamping member 12 is provided with similar seats $12^a$ in its rear or inner face each adapted to receive therewithin the corresponding portions of the bars 4 and 5, respectively, the two clamping members being secured together, as by means of a screw bolt 13.

Where round-rod stock is used for the bumper bars, as shown in Figs. 7 and 9, the seats provided in the clamping members 10 and 12 will be correspondingly rounded and a pair of screw bolts 13ª may be employed instead of a single bolt 13.

The central portions of the bars are rigidly connected by means of upper and lower clamping members 14 each having a hooked seat 14ª therein adapted to engage the top and the bottom edge and a part of the inner or rear face of the bars 1 and 3, respectively; also by means of a plurality of intermediate clamping members 15, spaced from each other and the members 14 and each having an upwardly-directed and a downwardly-directed hooked seat for the lower edge of an upper bar and the upper edge of a bar therebelow, the hooked seats being indicated at 15ª. The clamping members are provided with aligned bores adapted to receive a common clamping bolt 16. By adjusting the nut 16ª on the lower end of such bolt, the clamping members may be drawn into tight engagement with the plates 1–5 inclusive to form therefor a rigid central brace.

In Fig. 8 there is shown a modification of the clamping arrangement disclosed in Fig. 5 and which is particularly adapted for use with bars made of round rod stock. In this case, the central clamp comprises a pair of symmetrical members 17 each having rounded seats therein adapted to receive the front and rear surfaces of the bars 1–5, with bolts 18 interposed between the bars and connecting the members 17 together.

The bumper thus far described in detail may be considered as consisting of two units arranged one above the other and each comprising a front or impact bar and a rear or auxiliary bar, with an additional intermediate front or impact bar 2; or it may be considered as made up of two complete units similarly arranged, one unit comprising a front or impact bar and an adjacent rear or auxiliary bar, and the other unit comprising a pair of front or impact bars with an intermediate rear or auxiliary bar. By selecting various combinations of these units (with a corresponding selection of clamping members and connecting bolts) the height of the bumper may be varied to any extent that may be desirable.

In Figs. 3 and 6 there is shown a modification of the invention shown in the views discussed hereinbefore wherein the bumper may be considered as made of two units arranged one above the other, each unit comprising a pair of front or impact bars and an intermediate rear or auxiliary bar, the units being assembled in vertical alignment. The front or impact bars are indicated by the numerals 19, 20, 21 and 22 and the rear or auxiliary bars by the numerals 23 and 24. One unit in this case comprises the bars 19, 23 and 20 and the other unit the bars 21, 24 and 22. The front or impact bars are provided with eyes at their ends registering with the eyes at the ends of the intermediate bars, the ends of all of the bars being connected by the bolts 25. The central portions of the bars (where flat spring plate stock is employed) are connected by clamping devices substantially identical with those shown in Fig. 5, the bolt being indicated at 26, the upper and lower clamping members at 27, and the intermediate clamping members at 28. The means for pivotally supporting the bumper from the arm 7 is substantially identical with that shown in the preceding views; and the parts of the clamping members are designated by the same numerals as are employed on Figs. 2 and 4.

The advantage of employing round or substantially square stock for the bars of the bumpers as shown in Figs 7–10 inclusive, is that it enables a bumper to be constructed having a maximum strength with a minimum weight of material, it being understood that the front or impact portions of the bars should not be so narrow as to render unnecessarily liable to injury the objects encountered thereby. It has been found that bars which are substantially square, or round in section or having substantially equal vertical and horizontal dimensions are capable of realizing this maximum effective strength and lightness together with the ability to meet and withstand the ordinary incidents of use.

Having thus described my invention, what I claim is:

1. A bumper comprising a plurality of units arranged one above another and each comprising a front or impact section and a rear or auxiliary section, supporting means for the bumper engaging the rear or auxiliary sections, and common means for connecting the ends of the impact sections and of the rear or auxiliary sections.

2. A bumper comprising a plurality of units arranged one above another, each unit comprising a front or impact section and a rear or auxiliary section, the said sections being in different horizontal planes, means for connecting the ends of the sections of such bumper, and means engaging the rear or auxiliary sections for supporting the bumper from the vehicle frame.

3. A bumper comprising a plurality of vertically arranged units, each unit comprising a pair of vertically spaced impact sections and a rear or auxiliary section having its ends interposed between the ends of the front or impact section, common means for securing together the ends of all of the sections, and means cöoperating with the rear or auxiliary sections of the bumper for supporting the latter from the vehicle frame.

4. A bumper comprising a plurality of units, each unit comprising a front or impact section having eyes at its ends and a rear or auxiliary section also having eyes at its ends adapted to register with the eyes on the ends of the impact section, bolts extending through the eyes of the sections of such units, common clamping means for securing together the central portions of the rear or auxiliary sections and the central portions of the impact section, and means coöperating with the auxiliary sections for mounting the bumper upon a vehicle frame.

5. A bumper comprising a plurality of front or impact bars and a plurality of auxiliary bars, means connecting the ends of said bars, and means for clamping together the central portions of said bars in substantially vertical alignment, said means comprising an upper and a lower clamping member adapted to engage the upper edge of the uppermost bar and the lower edge of the lowermost bar, respectively, and one or more intermediate clamping members each having seats for the edge of a main bar and for the edge of an auxiliary bar, and means for adjusting the first two members toward each other.

6. A bumper comprising a plurality of units, each unit consisting of a front or impact section and a rear or auxiliary section, each section having eyes at its ends and the central portion of the rear or auxiliary section being bent into vertical alignment with the central portion of the impact section, bolts extending through the eyes of all of the sections of the bumper, clamping members engaging the central portions of all of the sections of such bumper, a bolt on which said clamping members are mounted, and means for supporting a bumper from a vehicle frame.

7. A bumper comprising a plurality of front or impact bars and a plurality of auxiliary bars, means connecting the ends of said bars, the central portions of the rear or auxiliary bars being bent into vertical alignment with the central portions of the impact bars, an upper and a lower clamping member having seats for the upper edge of the uppermost bar and the lower edge of the lowermost bar, respectively, intermediate clamping members each having an upper and a lower seat for the lower and the upper edge respectively, of adjacent bars, a bolt on which said clamping members are mounted, and a nut on said bolt for moving one of the first two clamping members toward the other.

In testimony whereof, I hereunto affix my signature.

HERBERT S. JANDUS.